United States Patent [19]

Eversoll

[11] Patent Number: 5,462,211
[45] Date of Patent: Oct. 31, 1995

[54] SPARE TIRE MOUNTED CONTAINER CARRIER

[76] Inventor: Earl K. Eversoll, 325 S. Wickiup, Apache Junction, Ariz. 85219

[21] Appl. No.: 393,437

[22] Filed: Feb. 23, 1995

[51] Int. Cl.$^6$ ................................ B62D 43/00
[52] U.S. Cl. ........................ 224/42.14; 224/42.13
[58] Field of Search .................... 224/42.13, 42.14, 224/42.42, 42.4, 42.39, 42.43, 42.44, 42.45 R, 42.46, 282; 248/499, 311.2, 293, 505

[56] References Cited

U.S. PATENT DOCUMENTS

| | | | |
|---|---|---|---|
| 1,376,693 | 5/1921 | Hilberg | 224/42.14 |
| 4,911,343 | 3/1990 | Lords et al. | 224/42.43 |
| 5,203,479 | 4/1993 | Lucas | 224/42.13 |
| 5,228,608 | 7/1993 | Stout, III | 224/42.46 R |

*Primary Examiner*—Henry J. Recla
*Assistant Examiner*—Timothy L. Maust

[57] ABSTRACT

A new and improved carrier adapted to be secured to the inner portion of a spare automotive tire comprising, in combination, a backing disk having an upper extent, a lower extent, a first side, a second side and a periphery therebetween. The backing disk has a diameter approximately equal to the inside diameter of an automotive tire. Two primary chain hooks are secured within the upper extent of the backing disk. The backing disk is adapted to be secured to the inner portion of a spare automotive tire. A base disk which is formed from an upper extent, a lower extent, a first side, a second side and a periphery therebetween is also incorporated. The base disk has a diameter approximately equal to the inside diameter of an automotive tire with two primary chain hooks secured to the base disk. A hinge serves to pivotally connect the backing disk to the base disk. Two primary chains are secured between the two primary chain hooks of the backing disk and the two primary chain hooks of the base disk.

4 Claims, 4 Drawing Sheets

SPARE TIRE MOUNTED CONTAINER CARRIER

BACKGROUND OF THE INVENTION

1. Field of the Invention

The present invention relates to a spare tire mounted container carrier and more particularly pertains to a device for easily mounting a cooler to a vehicle.

2. Description of the Prior Art

The use of container holders is known in the prior art. More specifically, container holders heretofore devised and utilized for the purpose of holding coolers are known to consist basically of familiar, expected, and obvious structural configurations, notwithstanding the myriad of designs encompassed by the crowded prior art which has been developed for the fulfillment of countless objectives and requirements.

For example, U.S. Pat. No. 5,165,645 to Brown discloses an exterior vehicle cooler holder.

U.S. Pat. No. Des. 328,052 to Stout, III discloses a combined spare tire cover and can carrier.

U.S. Pat. No. 3,543,311 to Richard discloses a foldable portable shelf for vehicles.

U.S. Pat. No. 3,421,458 to Salkoff discloses a combined hinge mounting and shelf.

Furthermore, U.S. Pat. No. 5,097,957 to Adams, Jr. et al discloses a portable hinged tray apparatus.

Lastly, U.S. Pat No. 4,195,577 to Gross discloses a portable hanging shelf.

In this respect, the spare tire mounted container carrier according to the present invention substantially departs from the conventional concepts and designs of the prior art, and in doing so provides an apparatus primarily developed for the purpose of easily mounting a cooler to a vehicle.

Therefore, it can be appreciated that there exists a continuing need for a new and improved spare tire mounted container carrier which can be used for easily mounting a cooler to a vehicle. In this regard, the present invention substantially fulfills this need.

SUMMARY OF THE INVENTION

In view of the foregoing disadvantages inherent in the known types of container holders now present in the prior art, the present invention provides an improved spare tire mounted container carrier. As such, the general purpose of the present invention, which will be described subsequently in greater detail, is to provide a new and improved spare tire mounted container carrier and method which has all the advantages of the prior art and none of the disadvantages.

To attain this, the present invention essentially comprises a carrying device for a container. The device is adapted to be secured to a spare automotive tire. More specifically, the device is adapted to be secured to the inner portion of a spare automotive tire which is vertically mounted to the rear of a vehicle. This spare tire mounting arrangement is most often found in jeeps and vans. In its broadest context, the present invention includes a backing disk with a backing ring pivotally coupled to a base disk with a base ring. The backing member is adapted to be secured to the inner portion of the spare tire. Thus, the carrying device would have two orientations: a closed orientation with the backing member in contact with the base member, and an open orientation with the base member pivoted 90 degrees relative to the backing member. In the open orientation the base member is adapted to receive a container, such as a five gallon water cooler. The carrying device will be more fully described herein.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent of legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved spare tire mounted container carrier which has all the advantages of the prior art container holders and none of the disadvantages.

It is another object of the present invention to provide a new and improved spare tire mounted container carrier which may be easily and efficiently manufactured and marketed.

It is further object of the present invention to provide a new and improved spare tire mounted container carrier which is of durable and reliable construction.

An even further object of the present invention is to provide a new and improved spare tire mounted container carrier which is susceptible of a low cost of manufacture with regard to both materials and labor, and which accordingly is then susceptible of low prices of sale to the consuming public, thereby making such spare tire mounted container carrier economically available to the buying public.

Still yet another object of the present invention is to provide a new and improved spare tire mounted container carrier which provides in the apparatuses and methods of the prior art some of the advantages thereof, while simultaneously overcoming some of the disadvantages normally associated therewith.

Even still another object of the present invention is to provide a device for easily mounting a cooler to a vehicle.

Lastly, it is an object of the present invention to provide a new and improved carrier adapted to be secured to the inner portion of a spare automotive tire comprising, in combination, a backing disk having an upper extent, a lower extent, a first side, a second side and a periphery therebetween. The backing disk has a diameter approximately equal to the inside diameter of an automotive tire. Two primary chain hooks are secured within the upper extent of the backing disk. The backing disk is adapted to be secured to the inner portion of a spare automotive tire. A base disk which is formed from an upper extent, a lower extent, a first side, a second side and a periphery therebetween is also incorporated. The base disk has a diameter approximately equal to the inside diameter of an automotive tire with two primary chain hooks secured to the base disk. A hinge serves to pivotally connect the backing disk to the base disk. Two primary chains are secured between the two primary chain hooks of the backing disk and the two primary chain hooks of the base disk.

These together with other objects of the invention, along with the various features of novelty which characterize the invention, are pointed out with particularity in the claims amended to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various Figures.

DESCRIPTION OF THE PREFERRED EMBODIMENT

Figure 1:
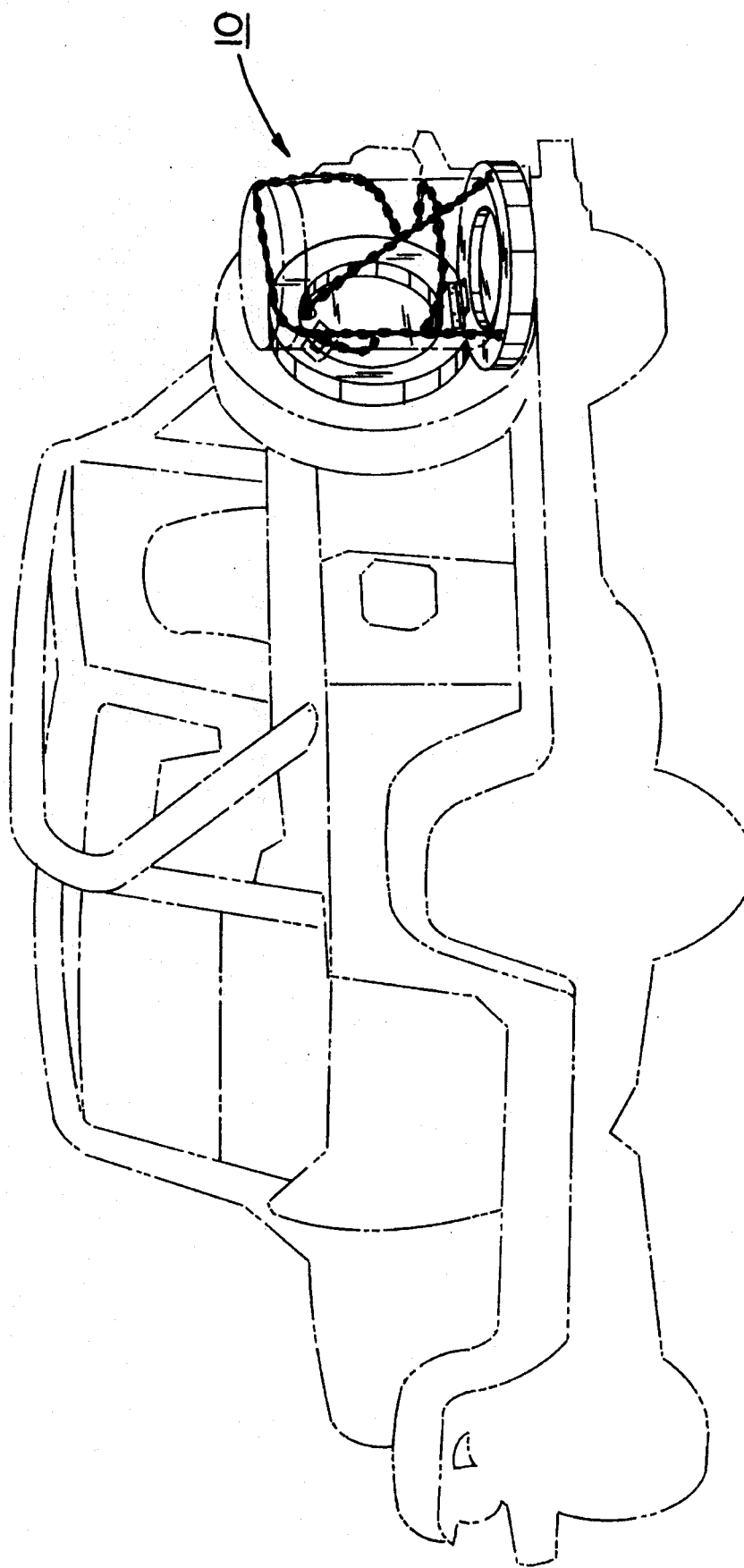
FIG. 1 is a perspective view of the preferred embodiment of the spare tire mounted container carrier constructed in accordance with the principles of the present invention.
Figure 2:
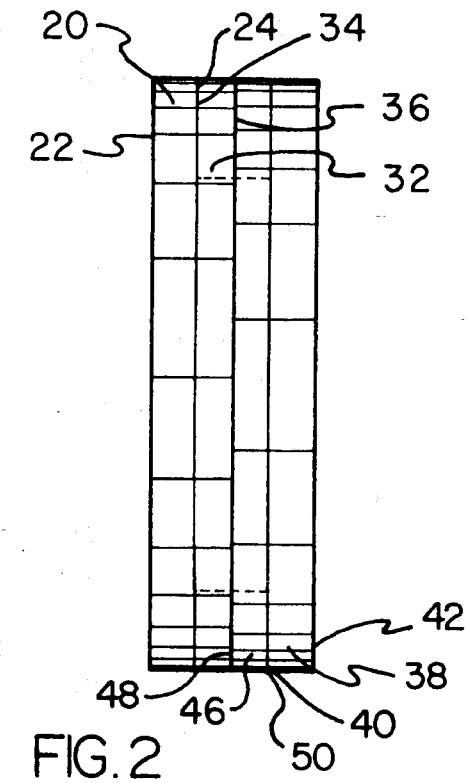
FIG. 2 is a view of the container carrier in its closed orientation.
Figure 3:
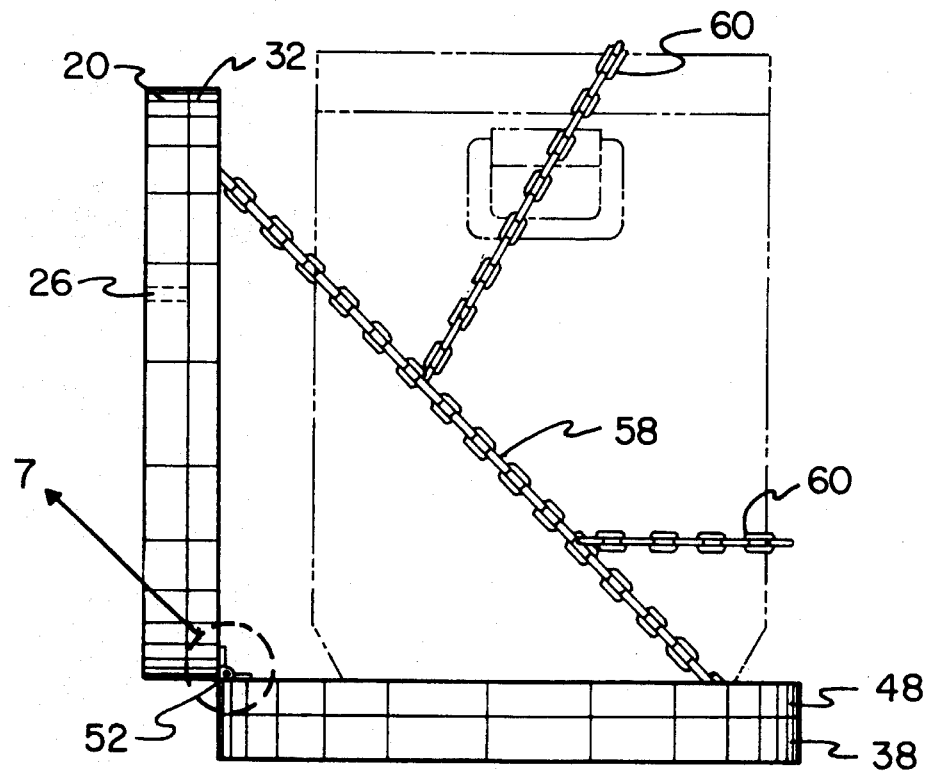
FIG. 3 is a side elevational view of the container carrier in use.
Figure 4:
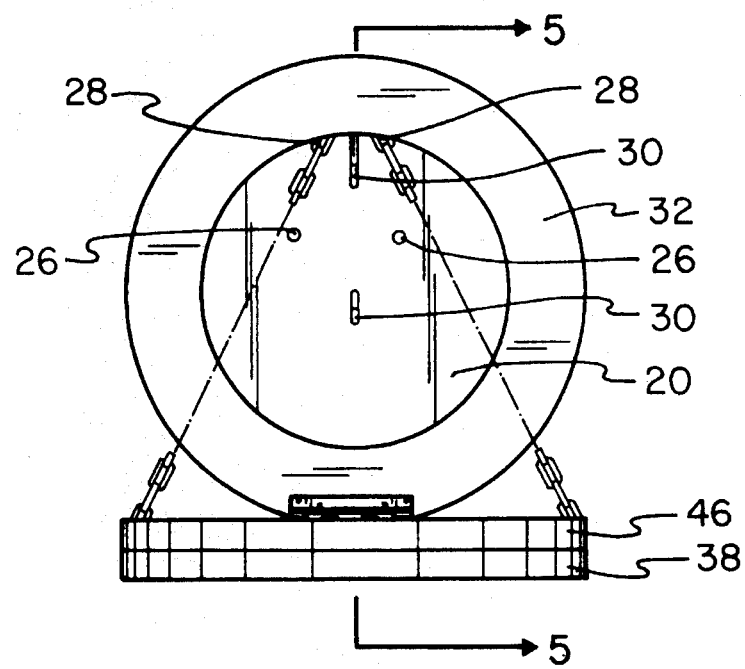
FIG. 4 is a front elevational view of the device in a mounted orientation for use.
Figure 5:
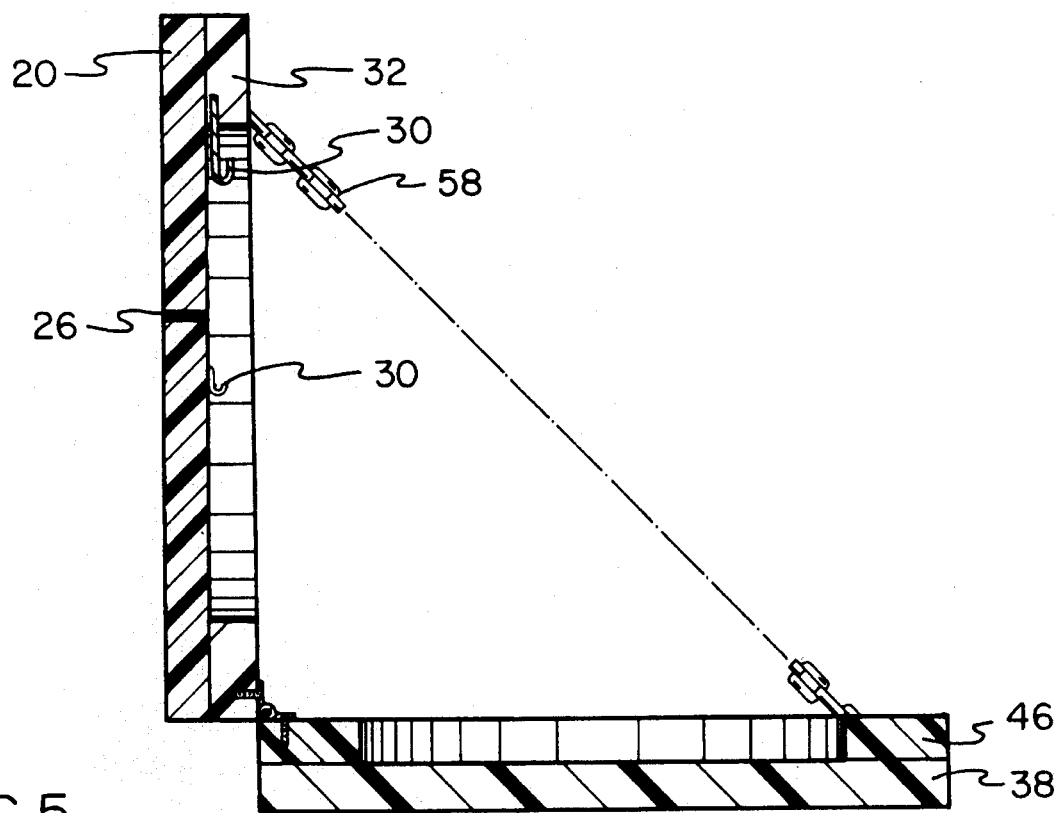
FIG. 5 is a cross-sectional view taken along lines 5—5 of FIG. 4.
Figure 6:
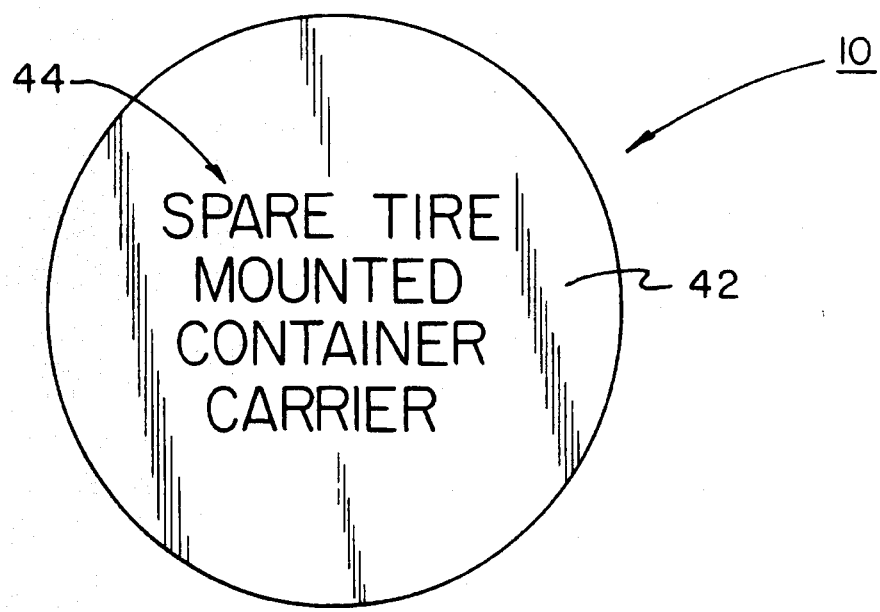
FIG. 6 is a front elevational view of a coupling component shown in the prior Figures.
Figure 7:
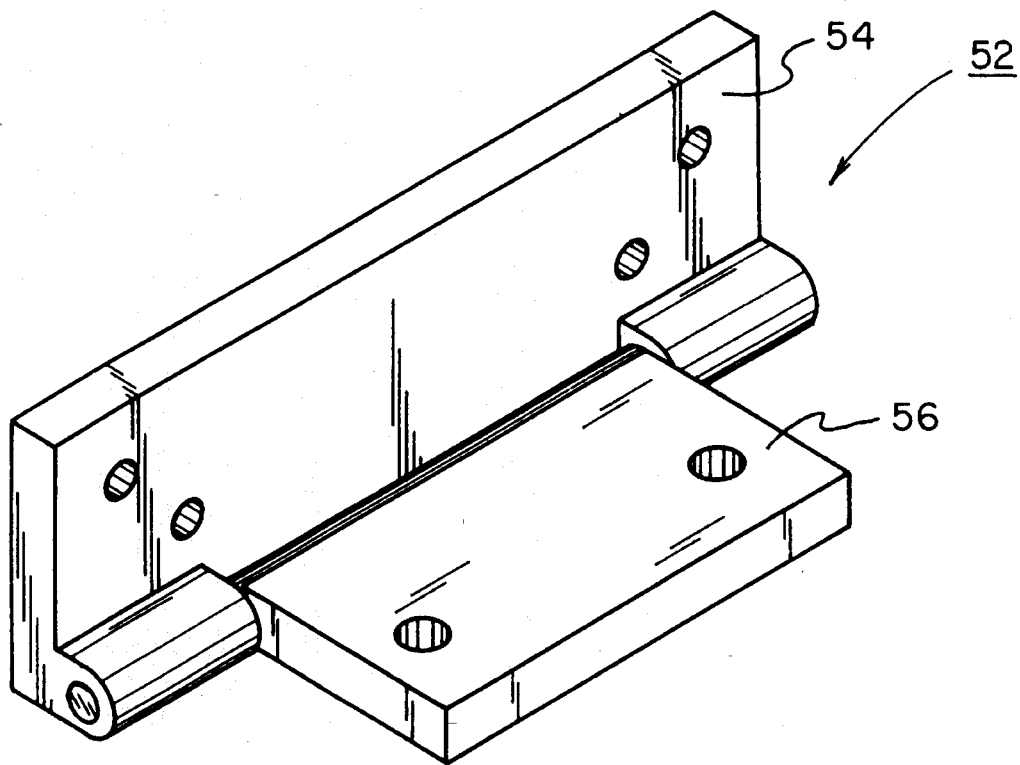
FIG. 7 is a perspective view of the hinge used by the present container carrier.

With reference now to the drawings, and in particular to FIG. 1 thereof, the preferred embodiment of the new and improved spare tire mounted container carrier embodying the principles and concepts of the present invention and generally designated by the reference numeral 10 will be described.

The present invention relates to a carrying device for a container. The device is adapted to be secured to a spare automotive tire. More specifically, the device is adapted to be secured to the inner portion of a spare automotive tire which is vertically mounted to the rear of a vehicle. This spare tire mounting arrangement is most often found in jeeps and vans. In its broadest context, the present invention includes a backing disk with a backing ring pivotally coupled to a base disk with a base ring. However, the present invention can employ simply a backing disk pivotally coupled to a base disk. The backing member is adapted to be secured to the inner portion of the spare tire. Thus, the carrying device would have two orientations: a closed orientation with the backing member in contact with the base member, and an open orientation with the base member pivoted 90 degrees relative to the backing member. In the open orientation the base member is adapted to receive a container, such as a five gallon water cooler. The carrying device will be more fully described herein.

The backing disk 20 is formed from an upper extent, a lower extent, a first side 22, a second side 24 and a periphery therebetween. The diameter of the backing disk 20 is approximately equal to the inside diameter of an automotive tire. Two mounting holes 26 are formed through the upper extent of the backing disk 20 with two bolts adapted to be inserted through the mounting holes 26 to secure the backing disk 20 to the inner portion of a spare automotive tire. Furthermore, two primary chain hooks 28 are secured within the upper extent of the backing disk 20, and two secondary chain hooks 30 are secured within the backing disk 20.

The backing ring 32 is formed from an inside diameter, an upper extent, a lower extent, a first side 34, a second side 36 and a periphery therebetween. The outside diameter of the ring is approximately equal to the diameter of the backing disk. The first side 34 of the backing ring 32 is secured to the second side of the backing disk 20. This securement can be achieved through any well known means such as nails, screws, glues etc.

The base disk 38 is formed from an upper extent, a lower extent, a first side 40, a second side 42 and a periphery therebetween. The diameter of the base disk 38 is approximately equal to the inside diameter of an automotive tire. Indicia 44 can be formed upon the second side 42 of the base disk 38. The second side 42 of the base disk 38 is visible when the carrying device is in its closed orientation, thus the second side 42 of the base disk 38 could carry an advertisement, or a logo.

The base ring 46 is formed from an inner diameter, an upper extent, a lower extent, a first side 48, a second side 50 and a periphery therebetween. The outside diameter of the ring is approximately equal to the diameter of the base disk 38. The second side 50 of the base ring 46 is secured to the first side 40 of the base disk 38. Furthermore, two primary chain hooks are secured to the upper extent of the base ring 46 about its outer periphery. In the alternative, the two primary chain hooks an be secured to the base disk 38.

A hinge 52 which incorporates a first mounting plate 54 pivotally secured to a second mounting plate 56 is employed in the carrying device of the present invention. The first mounting plate 54 is secured to the lower extent of the backing ring 32, and the second mounting plate 56 is secured to the lower extent of the base ring 46. The hinge 52 thus acts to pivotally relate the backing disk 20 and backing ring 32 to the base disk 38 and base ring 46. Furthermore, the carrier of the present invention can incorporate a latch mechanism to keep the carrier in a closed orientation with the backing disk 20 and the base disk 38 together. Any one of a variety of latches would serve this purpose. A two-piece latch could be employed with one piece of the latch secured to the upper extent of the backing disk, and the other piece secured to the upper extent of the base disk 38.

Two primary chains 58 are secured between the two primary chain hooks of the backing disk 20 and the two primary chain hooks of the base ring 46. The two primary chains 58 are of a length which allow the base disk 38 and base ring 46 to pivot 90 degrees relative to the backing disk 20 and backing ring 32.

Two secondary chains 60 are secured between the two secondary chain hooks of the backing disk. The secondary chains 60 serve to secure a container to the first side of the base disk 38 and the first side of the base ring 46 when the base disk 38 and base ring 46 are pivoted 90 degrees relative to the backing disk 20 and backing ring 32.

The backing ring 32 and the base ring 46 serve to create a cavity between the backing disk 20 and the base disk 38 when the carrier is in its closed orientation. This cavity facilitates the storage of the primary and secondary chains 60. Moreover, the chain hooks which are secured to the backing disk 20 can be employed to ensure that the chains do not rattle when they are between the backing disk 20 and the base disk 38.

What has been described hereinabove is a carrier that swings down from the spare tire mounted vertically on the back of a vehicle to support items like large beverage coolers. The carrier can be made of plastic which is sized to fit against the wheel rim on the spare tire. It rests against a ring of the same size clamped against the wheel with wing nuts and bolts extending from an angle iron at the back. A hinge at the bottom permits the carrier to swing down to a horizontal position, supported by chains at each side, providing a stable platform. When not in use the carrier is held against the tire with wing nuts on bolts that extend out from the back. After the carrier is released to swing down, the cooler is placed on the platform it provides and is held in place securely with chains around the outside, above the spigot, and over the top. The beverage container remains on the platform secured by chains, while the trip is made. This carrier permits large coolers to be stored outside the vehicle, enabling a full complement of passengers to occupy the interior. The carrier dimensions will match the size of the spare tire wheel. In production, modifications such as recesses for the container and locking provisions could be added. If access to the spare tire is needed, the unit is quickly removed.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved carrier adapted to be secured to an inner portion of a spare automotive tire having an inside diameter and an outside diameter, the carrier comprising, in combination;

a backing disk having an upper extent, a lower extent, a first side, a second side and a periphery therebetween, the backing disk having a diameter approximately equal to the inside diameter of said automotive tire, two mounting holes formed through the upper extent of the backing disk, two bolts adapted to be inserted through the mounting holes to secure the backing disk to the inner portion of a spare automotive tire, two primary chain hooks secured within the upper extent of the backing disk, two secondary chain hooks secured within the backing disk;

a backing ring having an upper extent, a lower extent, a first side, a second side and a periphery therebetween, the ring having an outside diameter approximately equal to the diameter of the backing disk, and an inside diameter, the first side of the backing ring secured to the second side of the backing disk;

a base disk having an upper extent, a lower extent, a first side, a second side and a periphery therebetween, the base disk having a diameter approximately equal to the inside diameter of said automotive tire, indicia formed upon the second side of the base disk;

a base ring having an upper extent, a lower extent, a first side, a second side and a periphery therebetween, the ring having an outside diameter approximately equal to the diameter of the base disk, and an inside diameter, the second side of the base ring secured to the first side of the base disk, two primary chain hooks secured to the upper extent of the base ring, a hinge having a first mounting plate pivotally secured to a second mounting plate, the first mounting plate secured to the lower extent of the backing ring, the second mounting plate secured to the lower extent of the base ring, the hinge thus pivotally relating the backing disk and backing ring to the base disk and base ring;

two primary chains secured between the two primary chain hooks of the backing disk and the two primary chain hooks of the base ring, the two primary chains being of a length to allow the base disk and base ring to pivot 90 degrees relative to the backing disk and backing ring; and two secondary chains secured between the two secondary chain hooks of the backing disk, the secondary chains serving to secure a container to the first side of the base disk and the first side of the base ring when the base disk and base ring are pivoted 90 degrees relative to the backing disk and backing ring.

2. A carrier adapted to be secured to an inner portion of a spare automotive tire having an inside diameter and an outside diameter comprising:

a backing disk having an upper extent, a lower extent, a first side, a second side and a periphery therebetween, the backing disk having a diameter approximately equal to the inside diameter of said automotive tire, two primary chain hooks secured within the upper extent of the backing disk, the backing disk adapted to be secured to the inner portion of a spare automotive tire;

a base disk having an upper extent, a lower extent, a first side, a second side and a periphery therebetween, the base disk having a diameter approximately equal to the inside diameter of said automotive tire, two primary chain hooks secured to the base disk;

a hinge pivotally connecting the backing disk to the base disk; and two primary chains secured between the two primary chain hooks of the backing disk and the two primary chain hooks of the base disk.

3. The carrier as described in claim 2 further comprising:

indicia formed upon the second side of the base disk.

4. The carrier as described in claim 2 further comprising:

a secondary chain secured to the second surface of the backing disk, the secondary chain serving to secure a container to the first side of the base disk.

* * * * *